March 28, 1933. J. P. BURKE 1,902,831
INTERNAL COMBUSTION ENGINE
Filed March 30, 1929
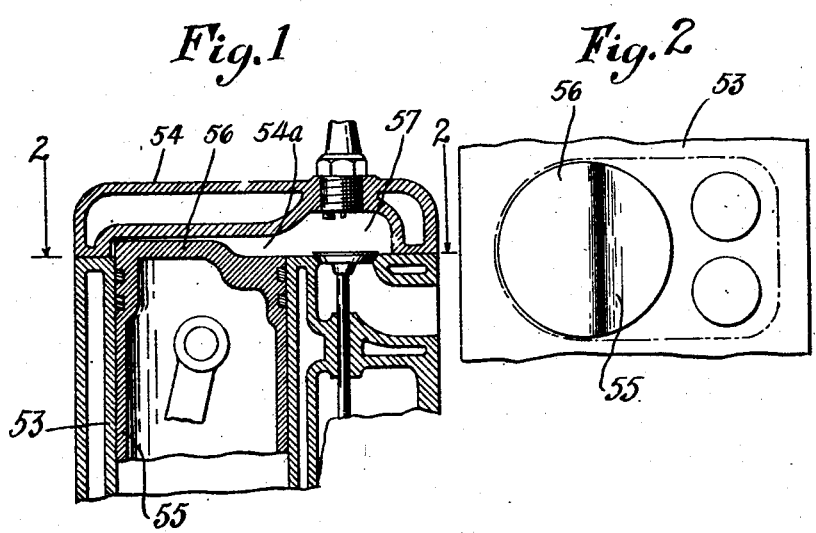

Patented Mar. 28, 1933

1,902,831

UNITED STATES PATENT OFFICE

JAMES P. BURKE, OF NEWARK, NEW JERSEY, ASSIGNOR OF TWENTY PER CENT TO JAMES MacINTOSH, OF NORRISTOWN, PENNSYLVANIA, OF TWENTY PERCENT TO KENNETH W. MACKSEY, AND OF TEN PER CENT TO SIDNEY I. HOWELL, BOTH OF MONTCLAIR, NEW JERSEY

INTERNAL COMBUSTION ENGINE

Application filed March 30, 1929. Serial No. 351,279.

This invention relates to internal combustion engines.

One object of the invention is to provide a device of the character described which will function with a high efficiency and in which the area of communication between the combustion chamber and the cylinder may be large.

Other objects of the invention are to provide an improved device of the nature set forth in which the turbulence of the gases is promoted; in which the combustion gases act on a reduced area of the piston in the position of greatest compression of the same to prevent the expanding gases at the instant of combustion from exerting too great a force on the piston and thus to eliminate "knocking."

Other objects and advantages of the invention will become apparent as the specification proceeds.

With the aforesaid objects in view, the invention consists in the novel combinations and arrangements of parts hereinafter described in their preferred embodiments, pointed out in the subjoined claim, and illustrated on the annexed drawing, wherein like parts are designated by the same reference characters throughout the several views.

In the drawing:

Figure 1 is a fragmentary view in vertical section of a device embodying the invention, the valves being at a side of the cylinder.

Fig. 2 is a horizontal view of the cylinder and piston taken substantially on line 2—2 of Fig. 1.

The advantages of the invention as here outlined are best realized when all of its features and instrumentalities are combined in one and the same structure, but, useful devices may be produced embodying less than the whole.

It will be obvious to those skilled in the art to which this invention appertains, that the same may be incorporated in several different constructions. The accompanying drawing, therefore, is submitted merely as showing the preferred exemplification of the invention.

Generally described, the invention provides an internal combustion engine in which the piston coacts with the cylinder head to form a combustion space therein above the cylinder which is of lesser area than the cylinder and preferably communicates unrestrictedly therewith. This combustion space is provided by recessing the piston or the cylinder head, but preferably the former since it makes for higher efficiency of combustion. For this purpose the piston is recessed at its periphery, this recess constituting the whole or a part of the combustion space depending upon the type of engine used. The central portion of the piston extends into proximity to the transverse wall of the cylinder head. The precise spacing may be varied to suit different operating conditions although it is preferred that the piston approach within mechanical working clearance of the said wall. Among the advantages of the recessed construction referred to are that an eddying or turbulence of the gases is obtained.

Within the scope of the invention, the piston may be offset to provide in the position of greatest compression a relatively small compact pocket or combustion chamber for the gases, with the pressure on the piston at the instant of combustion restricted to a comparatively small area.

In the drawing is shown an embodiment of the invention including a cylinder 53, a head 54 therefor having a space 54a communicating with the cylinder, and a piston 55 in the cylinder having an offset projection or block 56 remote from the side pocket or combustion chamber 57 forming a recess adjacent to the latter. This offset piston approaches into comparatively close proximity to the head 54, so that the space provided for the combustion of the gases is small and compact including the pocket 57 and said recess in unrestricted communication, whereby the gases may be consumed with a high efficiency and a minimum of skin friction, while, at the same time, the pressure on the piston at the instant of combustion is reduced.

I claim:

An L-head internal combustion engine, including a cylinder, a head therefor, said head being constructed to have a space in registry with the cylinder, said space being of comparatively small uniform depth, said head having a combustion pocket positioned substantially wholly laterally and above the cylinder, said pocket being deeper than the said space and having unrestricted communication therewith, gas fuel and air intake and exhaust valves at said pocket, the said pocket being otherwise closed, fuel ignition means for the pocket, a piston in the cylinder, said piston in the position of greatest compression thereof entering said space and approaching in comparatively close proximity to the opposed wall of the head, said piston having a recess of substantially uniform depth in the upper end thereof, said recess being adjacent to the combustion pocket, said recess forming with said pocket an unrestricted combustion compartment in the position of greatest compression of the piston, said combustion compartment providing the total volume of space for combustion and being comparatively small for high compression of the fuel and air, said opposed wall of the head having a transverse corner at the junction of said space and the combustion pocket and the intake valve being arranged opposite to said opposed wall and in proximity to said corner for increasing turbulence and mixing of the fuel and air.

In testimony whereof I affix my signature.

JAMES P. BURKE.